US011697307B2

(12) United States Patent
Celik et al.

(10) Patent No.: US 11,697,307 B2
(45) Date of Patent: Jul. 11, 2023

(54) WHEEL FOR A SUPPORT STRUCTURE

(71) Applicant: The Goodyear Tire & Rubber Company, Akron, OH (US)

(72) Inventors: Ceyhan Celik, Stow, OH (US); Steven Amos Edwards, Akron, OH (US); Arun Kumar Byatarayanapura Gopala, Copley, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 263 days.

(21) Appl. No.: 17/111,675

(22) Filed: Dec. 4, 2020

(65) Prior Publication Data

US 2022/0176734 A1    Jun. 9, 2022

(51) Int. Cl.
*B60C 7/26* (2006.01)
*B60B 5/02* (2006.01)
*B60C 7/14* (2006.01)
*B60B 25/00* (2006.01)
*B60B 3/04* (2006.01)
*B60B 9/26* (2006.01)

(52) U.S. Cl.
CPC ............... *B60C 7/26* (2013.01); *B60B 5/02* (2013.01); *B60B 25/006* (2013.01); *B60C 7/14* (2013.01); *B60B 3/041* (2013.01); *B60B 9/26* (2013.01); *B60B 2320/10* (2013.01); *B60B 2360/10* (2013.01); *B60B 2360/30* (2013.01); *B60B 2900/313* (2013.01); *B60C 7/146* (2021.08)

(58) Field of Classification Search
CPC .. B60C 7/26; B60C 7/14; B60C 7/146; B60B 5/02; B60B 9/26; B60B 2320/10; B60B 2360/10; B60B 2360/30; B60B 2900/313; B60B 25/00; B60B 25/002; B60B 25/006
See application file for complete search history.

(56) References Cited

U.S. PATENT DOCUMENTS

| | | | |
|---|---|---|---|
| 10,040,317 B2 * | 8/2018 | Celik | ........................ B60C 7/12 |
| 10,207,544 B2 | 2/2019 | Celik | |
| 10,286,725 B2 | 5/2019 | Celik et al. | |
| 10,406,852 B2 | 9/2019 | Celik et al. | |
| 10,457,094 B2 | 10/2019 | Celik et al. | |
| 10,603,956 B2 | 3/2020 | Celik et al. | |
| 2012/0205017 A1 * | 8/2012 | Endicott | ................. B60B 21/06 152/1 |
| 2016/0016426 A1 | 1/2016 | Endicott | |
| 2018/0134072 A1 | 5/2018 | Celik et al. | |

(Continued)

OTHER PUBLICATIONS

European Search Report for Serial No. EP21211110 dated Apr. 4, 2022.

*Primary Examiner* — Kip T Kotter
(74) *Attorney, Agent, or Firm* — June E. Rickey; Robert N. Lipcsik (57) ABSTRACT

A wheel assembly for a tire includes a circular hub member for securing to a rotatable axle of a vehicle, a first rim piece for engaging the hub member, a second rim piece for engaging the first rim piece, and a plurality of cylindrical sleeves for engaging both the first rim piece and the second rim piece. The first rim piece has cylindrical first shafts each engaging a first end of one of the sleeves. The second rim piece has cylindrical second shafts each engaging a second opposite end of one of the sleeves. An outer cylindrical surface of each sleeve engages a separate and distinct part of the tire.

21 Claims, 13 Drawing Sheets

(56) References Cited

U.S. PATENT DOCUMENTS

| | | | |
|---|---|---|---|
| 2019/0152256 A1* | 5/2019 | Hwang | ................... B60B 25/20 |
| 2019/0176516 A1 | 6/2019 | Celik et al. | |
| 2019/0299709 A1 | 10/2019 | Celik et al. | |
| 2019/0337328 A1 | 11/2019 | Celik et al. | |
| 2020/0031166 A1 | 1/2020 | Celik et al. | |

* cited by examiner

WHEEL FOR A SUPPORT STRUCTURE

FIELD OF INVENTION

The present invention relates to wheel/tire assemblies, and more particularly, to non-pneumatic wheel/tire assemblies.

BACKGROUND OF THE INVENTION

Radial pneumatic tires rely on the ply reinforcement to carry and transfer the load between the rim and the belt layer. These ply cords need to be tensioned to carry the load. Tensioning of these ply cords is achieved with the pressurized air in the inner chamber of the tire. If air pressure is lost, load carrying capacity of a pneumatic tire decreases significantly. Preventing the slow or sudden air pressure loss has been a challenge for the tire makers. One proposed solution is to use non-pneumatic tires. A top loader non-pneumatic tire can perform similar to a pneumatic tire if its durability, speed rating/limit and load capacity can be increased to the levels of a pneumatic tire.

Many top loader non-pneumatic tires rely on the polymeric spokes to carry the load of the vehicle. Spokes transfer the load from the rim to the shear band. Due to the characteristics of the polymeric materials used in the spokes of these tires, performance of these tires is limited. It is an object of the present invention to overcome this limitation and increase the load carrying capacity and durability of these spokes and hence the performance of the top loader non-pneumatic tire.

DEFINITIONS

As used herein and in the claims:

"Annular" means formed like a ring.

"Axial" and "axially" refer to lines or directions that are parallel to the axis of rotation of the tire.

"Circumferential" and "circumferentially" mean lines or directions extending along the perimeter of the surface of the annular tire parallel to the equatorial plane (EP) and perpendicular to the axial direction; it can also refer to the direction of the sets of adjacent circular curves whose radii define the axial curvature of the tread, as viewed in cross section.

"Cut shearband ply" refers to a shearband having a width less than the tread width, which lies flat over the carcass plies in the crown area of the tire.

"Crown" means that portion of the tire in the proximity of the tire tread.

"Elastomer" means a resilient material capable of recovering size and shape after deformation.

"Equatorial plane (EP)" means the plane perpendicular to the tire's axis of rotation and passing through the center of its tread; or the plane containing the circumferential centerline of the tread.

"Evolving tread pattern" means a tread pattern, the running surface of which, which is intended to be in contact with the road, evolves with the wear of the tread resulting from the travel of the tire against a road surface, the evolution being predetermined at the time of designing the tire, so as to obtain adhesion and road handling performances which remain substantially unchanged during the entire period of use/wear of the tire, no matter the degree of wear of the tread.

"Footprint" means the contact patch or area of contact of the tire tread with a flat surface at zero speed and under normal load and pressure.

"Inner" means toward the inside of the tire and "outer" means toward its exterior.

"Inboard side" means the side of the tire nearest the vehicle when the tire is mounted on a wheel and the wheel is mounted on the vehicle.

"Lateral" means an axial direction.

"Load range" means load and inflation limits for a given tire used in a specific type of service as defined by tables in The Tire and Rim Association, Inc.

"Net contact area" means the total area of ground contacting elements between defined boundary edges as measured around the entire circumference of the tread.

"Normal load" means the specific design inflation pressure and load assigned by the appropriate standards organization for the service condition for the tire.

"Outboard side" means the side of the tire farthest away from the vehicle when the tire is mounted on a wheel and the wheel is mounted on the vehicle.

"Radial" and "radially" mean directions radially toward or away from the axis of rotation of the tire.

"Self-supporting run-flat" means a type of tire that has a structure wherein the tire structure alone is sufficiently strong to support the vehicle load when the tire is operated in the uninflated condition for limited periods of time and limited speed. The sidewall and internal surfaces of the tire may not collapse or buckle onto themselves due to the tire structure alone (e.g., no internal structures).

"Sidewall" means that portion of a tire radially between the tread and the bead.

"Spring rate" means the stiffness of tire expressed as the slope of the load deflection curve at a given pressure.

"Stiffness ratio" means the value of a control shearband structure stiffness divided by the value of another shearband structure stiffness when the values are determined by a fixed three point bending test having both ends of the cord supported and flexed by a load centered between the fixed ends.

"Tensile stress" is force expressed in force/cross-sectional area. Strength in psi=12,800 times specific gravity times tenacity in grams per denier.

"Tension" for a cord means force on the cord expressed as mN/tex.

"Tread" means a molded rubber component which, when bonded to a tire casing, includes that portion of the tire that comes into contact with the road when the tire is normally inflated and under normal load.

"Tread width" means the arc length of the tread surface in a plane including the axis of rotation of the tire.

"Vertical deflection" means the amount that a tire deflects under load.

SUMMARY OF THE INVENTION

A wheel assembly for a tire, in accordance with the present invention, includes a circular hub member for securing to a rotatable axle of a vehicle, a first rim piece for engaging the hub member, a second rim piece for engaging the first rim piece, and a plurality of cylindrical sleeves for engaging both the first rim piece and the second rim piece. The first rim piece has cylindrical first shafts each engaging a first end of one of the sleeves. The second rim piece has cylindrical second shafts each engaging a second opposite end of one of the sleeves. An outer cylindrical surface of each sleeve engages a separate and distinct part the tire.

According to another aspect of the wheel assembly, the first rim piece has first securement openings arrayed circumferentially about the first rim piece.

According to still another aspect of the wheel assembly, the second rim piece has second securement openings arrayed circumferentially about the second rim piece.

According to yet another aspect of the wheel assembly, each of the first securement openings of the first rim piece is axially aligned with a corresponding second securement opening of the second rim piece.

According to still another aspect of the wheel assembly, each of the sleeves has a radially outer surface for engaging corresponding loops of the tire.

According to yet another aspect of the wheel assembly, each corresponding pair of first and second securement openings are radially and circumferentially secured and fixed in axially aligned relative positions by a bolt member of a plurality of bolt members and a corresponding fastener member of a plurality of fastener members.

According to still another aspect of the wheel assembly, the first shafts and the second shafts have serrated cylindrical surfaces for securely fixing the sleeves to the first shafts and second shafts.

According to yet another aspect of the wheel assembly, each first and second shaft engages a cylindrical inner surface of one of the sleeves.

According to still another aspect of the wheel assembly, the first and second rim pieces are constructed of a metal.

According to yet another aspect of the wheel assembly, the first and second rim pieces are constructed of a polymer.

A method for supporting a vehicle load, in accordance with the present invention, includes the steps of: axially engaging first ends of cylindrical sleeves by serrated first shaft members of a first rim piece; axially engaging second ends of the cylindrical sleeves by serrated second shaft members of a second rim piece; axially and radially engaging loop members of a tire assembly by outer cylindrical surfaces of the cylindrical sleeves; and inserting each of a plurality of bolt members through one first bore hole in the first rim piece and one axially aligned corresponding second bore hole in the second rim piece.

According to another aspect of the method, a further step includes axially securing a plurality of fastener members to each of a plurality of bolt members.

According to still another aspect of the method, a further step includes securing a circular hub member to the first rim piece thereby allowing rotational attachment to a vehicle.

According to yet another aspect of the method, a further step includes arraying the first bore holes circumferentially about the first rim piece.

According to still another aspect of the method, a further step includes arraying the second bore holes circumferentially about the second rim piece.

According to yet another aspect of the method, a further step includes arraying the first bore holes circumferentially about the first rim piece.

According to still another aspect of the method, a further step includes radially and circumferentially fixing the first rim piece to the second rim piece in axially aligned relative positions by the bolt members and a corresponding fastener member.

According to yet another aspect of the method, a further step includes engaging a cylindrical inner surface of each of the sleeves by one of the first shaft members.

According to still another aspect of the method, a further step includes engaging the cylindrical inner surface of each of the sleeves by one of the second shaft members.

According to yet another aspect of the method, a further step includes engaging a cylindrical inner surface of each of the sleeves by one of the first shaft members and a corresponding one of the second shaft members.

BRIEF DESCRIPTION OF THE DRAWINGS

The present invention will be more clearly understood by the following description of some examples thereof, with reference to the accompanying drawings, in which.

DESCRIPTION OF EXAMPLES OF THE PRESENT INVENTION

A conventional wheel/tire assembly may have an outer ring, such as a shear band, flexibly connected to a central hub by means of lightweight composite springs. The springs may be plates fixed to the ring and to the hub. The hub may contain a speed reduction gear unit and/or an electric motor and may have a suspension mechanism for connecting a vehicle chassis to each wheel. The ring may be constructed from a flexible composite material, such as carbon fiber reinforced nylon material and have twin rubber tires and a plurality of circumferentially spaced-apart radial cleats which engage the ground and provide improved traction. The hub may also be formed from a carbon fiber reinforced composite material. Another conventional wheel may have a rubber strip with a molded tread bonded to a composite ring for improved grip. Further, the springs interconnecting the ring and hub may be S-shaped lightweight composite springs.

Another conventional wheel/tire assembly may be formed from a lightweight composite material, such as carbon fiber reinforced polyamide. The assembly may have a cylindrical central hub and a circular outer flexible rim mounted on the central hub by an endless looped spring band extending between the central hub and the circular rim. Six radial loops may be defined by the spring band. The spring band may be attached to the central hub and to the circular rim by any suitable means, such as adhesion, cohesion, soldering and/or mechanical fixing by means of bolts, rivets, and/or clamps.

An example wheel/tire assembly, such as that described in Applicant's U.S. Pat No. 10,207,544 and U.S. Pat No. 0,603,956, both incorporated herein by reference in their entirety, may be formed from a lightweight polymer material, such as, for example, a standard tire rubber compound, a thermoplastic polymer, polyethylene terephthalate (PET), polyether ether ketone (PEEK), a cross-linking polymer like natural rubber, synthetic rubber-like polymers, epoxy resins, and/or phenolic resins. The assembly may have an inner central rim, such as an automobile wheel (not shown), and a circular outer flexible ring, which may include a shear band and tread structure, mounted on the inner central rim by a continuous cord/fabric reinforced spoke structure extending between the inner central rim and the outer ring.

The spoke structure may define a plurality of cavities disposed concentrically about the inner central rim allowing the spoke structure to deflect under load thereby defining a suitable balance between flexibility for ride comfort and traction within a footprint of the assembly and stiffness for vehicle handling, low rolling resistance, and low heat build-up within the spoke structure. The cavities of the spoke structure may further define openings for arms of the inner central rim to extend therethrough and secure the spoke structure to the inner central rim. The arms may engage portions in a mechanical interlocking arrangement. The inner central rim may further include plates that, along with the arms may sandwich the portions of the spoke structure and create a further frictional and/or adhesive securement between the inner central rim and the spoke structure. The spoke structure may comprise a homogenous or heterogeneous polymer and/or a filled polymer.

Spokes of the spoke structure may be curved inwardly or outwardly for mitigating or enhancing buckling of the spokes. The spokes may include one or more reinforcing layers. The layer(s) may be constructed of single end dipped cords, conventional pneumatic tire ply/cord arrangements, short fibers, and/or polymeric film. Further, these constructions may be PET, nylon 6, nylon 6,6, rayon, steel, glass fibers, carbon fiber, aramid, and/or a hybrid construction of these materials. The cords may be from 400 denier to 9000 denier. The polymeric film may be from 0.1 mm to 2.0 mm thick. The spokes may be oriented at angle between 0 degrees and 90 degrees. The reinforcement of the spokes may be continuously reinforced across their entire axial length. Continuous reinforcement layer(s) may extend radially outward to multiple locations adjacent to a shear band at the outer flexible ring.

Each cavity may have a common cross-sectional profile about the axis of rotation of the assembly. Further, each cavity may have a common axial length equal to a uniform axial thickness of the spoke structure. Each cavity may be curvedly shaped to prevent "pinch" points on the reinforcement layer(s) and mitigate compressive stress concentrations on the reinforcement layer(s). The number of cavities may be between 2 and 60 for large scale tire assemblies. The inner central rim may include steel, cast iron, aluminum, aluminum alloys, magnesium allows, and/or iron alloys.

FIGS. 1-12 show a wheel assembly 200 in accordance with the present invention for use with pneumatic and/or non-pneumatic tire assemblies, such as the example tire assembly described above. The wheel assembly 200 may include a first annular rim piece 210 and a second axially opposite second annular rim piece 220. One of the rim pieces 210 or 220 may be secured to a circular hub member 230 and thereby secured to a rotatable axle or similar structure of a vehicle (not shown). The first and second rim pieces 210, 220 may be constructed of any suitable material, such as metal, polymer, ceramic, and/or a combination thereof.

The first rim piece 210 may have axially extending cylindrical first posts or first shafts 212 for each engaging a first axial end 242 of a corresponding cylindrical sleeve of a plurality of sleeves 241. The first rim piece 210 may further have first securement openings or first bore holes 214 arrayed circumferentially about the first rim piece. The second rim piece 220 may have axially extending cylindrical second posts or second shafts 222 for each engaging a second axial end 244 of a corresponding cylindrical sleeve of a plurality of sleeves 241. The second rim piece 220 may further have second securement openings or second bore holes 224 arrayed circumferentially about the second rim piece. Radially outer surfaces 245 of each of the sleeves 241 may engage corresponding loops 111 of a spoke structure 110 of an example tire assembly 140. The first and/or second shafts 212, 222 may have serrated annular outer surfaces 213 for more securely fixing the first and/or second shafts to the inner cylindrical surfaces of the sleeves 241.

Figure 1:
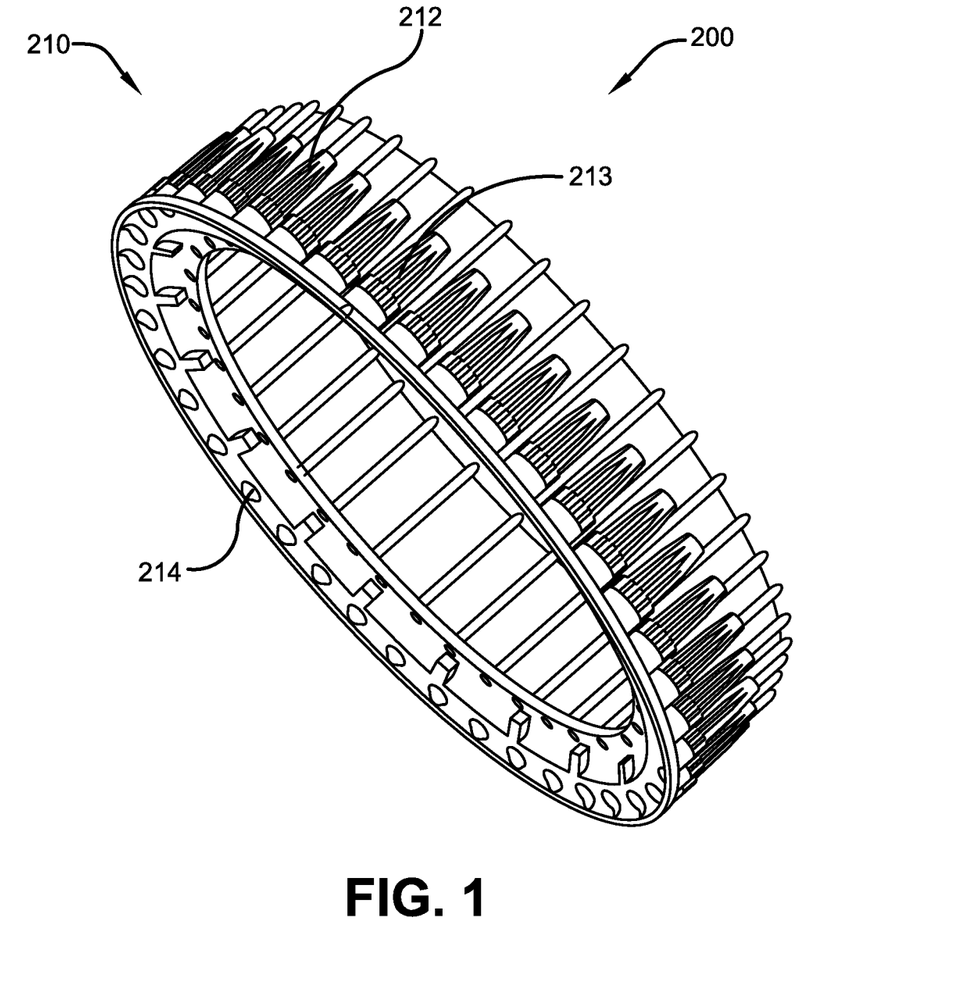
FIG. 1 is a schematic perspective view of an example first part of an example wheel assembly in accordance with the present invention.
Figure 2:
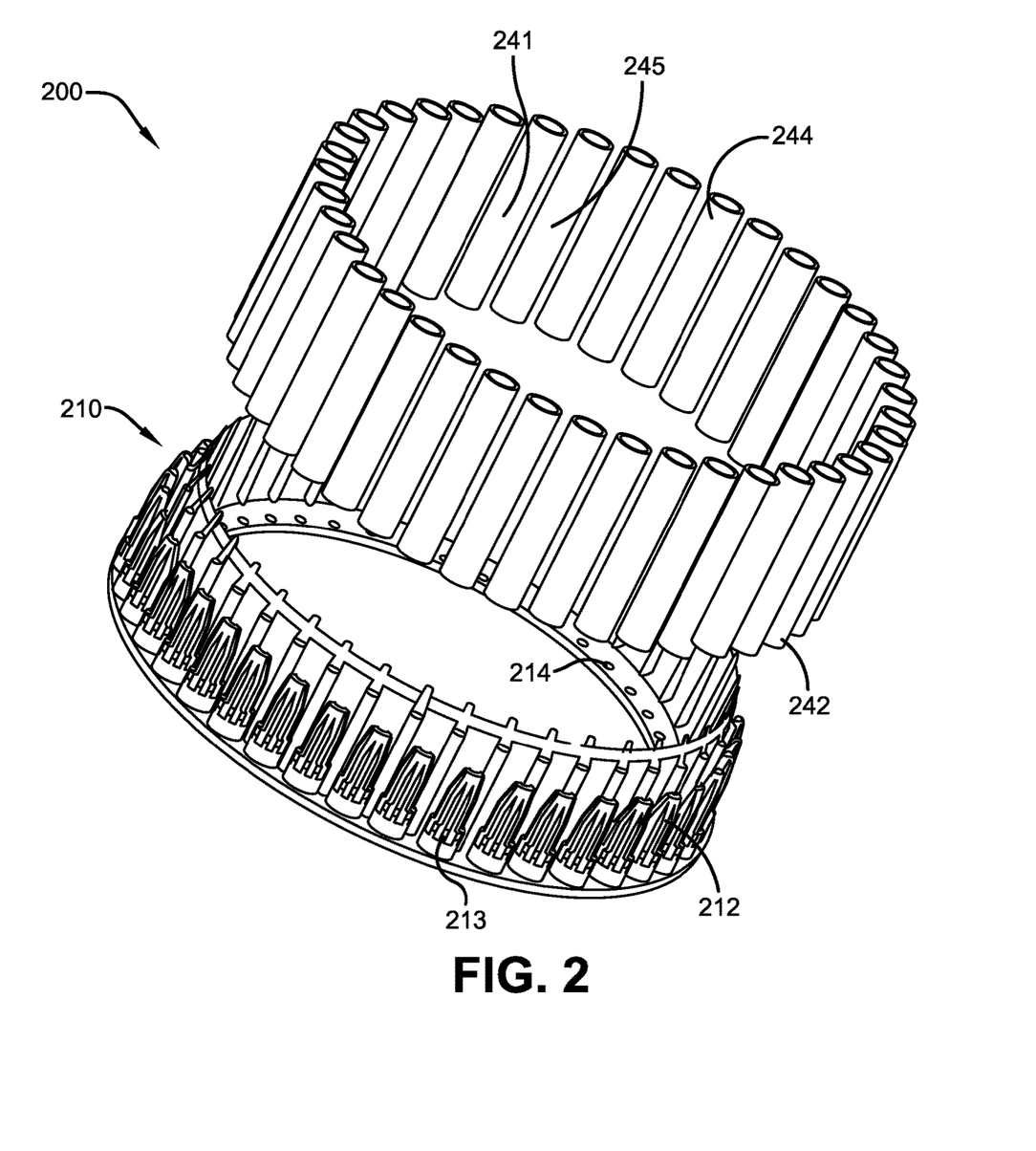
FIG. 2 is another schematic perspective view of the first part and an example second part of the wheel assembly of FIG. 1.
Figure 3:
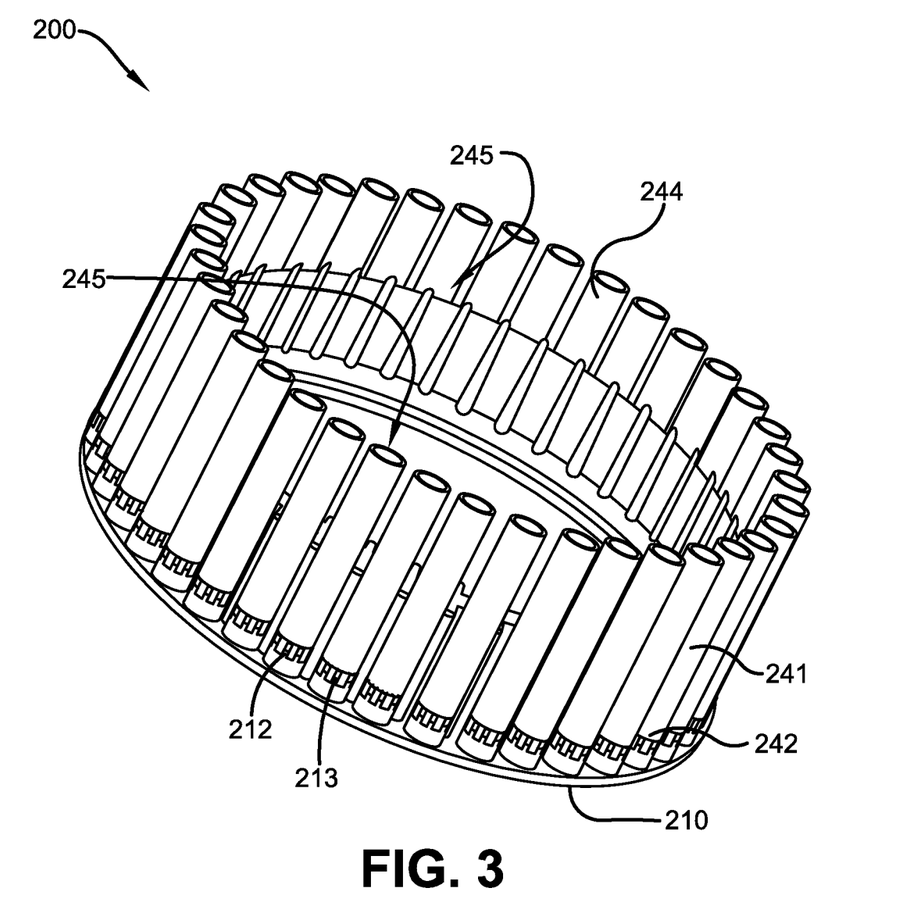
FIG. 3 is still another schematic perspective view of the assembled first and second parts of the wheel assembly of FIG. 2.
Figure 4:
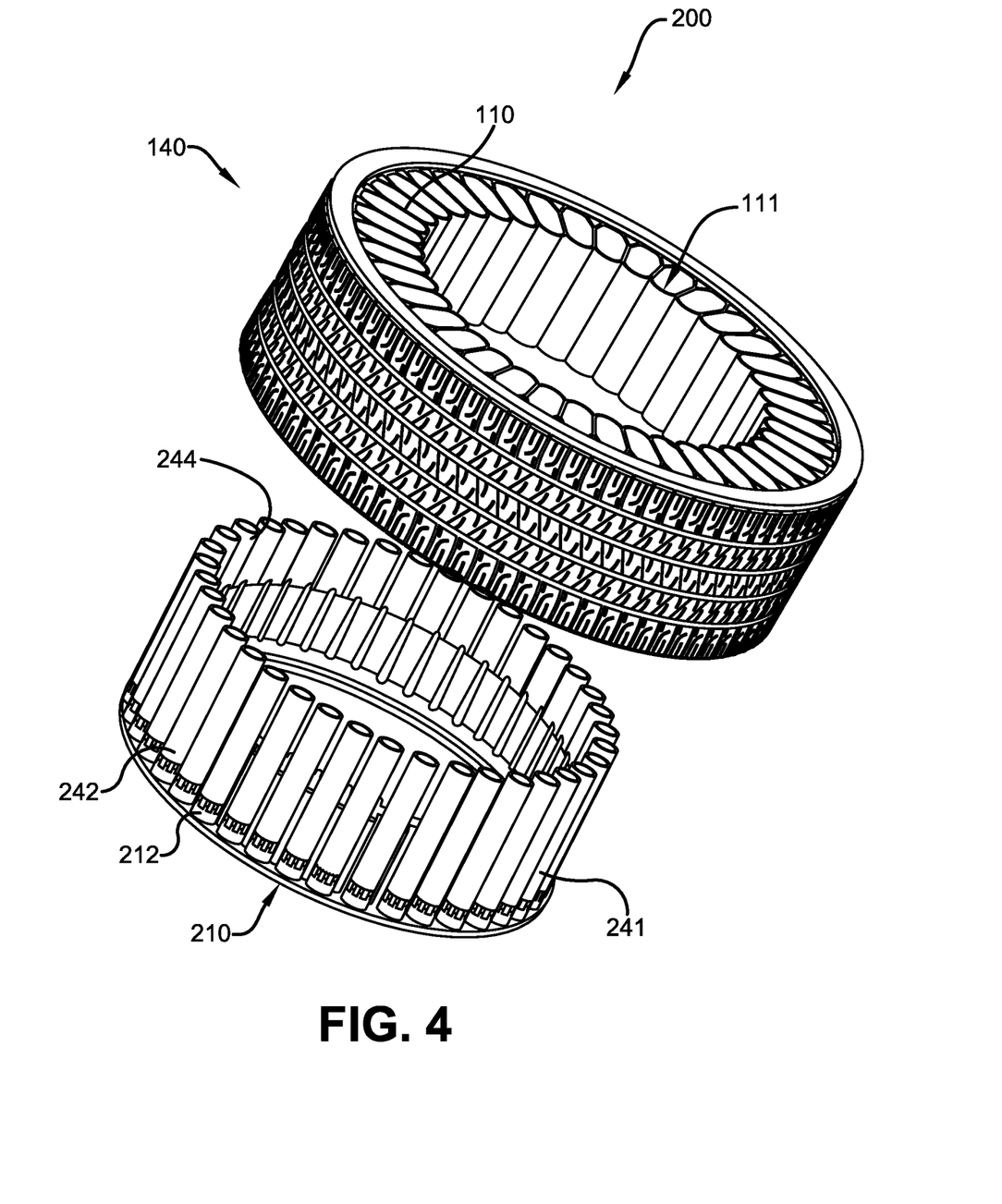
FIG. 4 is a yet another schematic perspective view of the assembled wheel assembly of FIG. 3 and an example tire for use with the present in invention.
Figure 5:
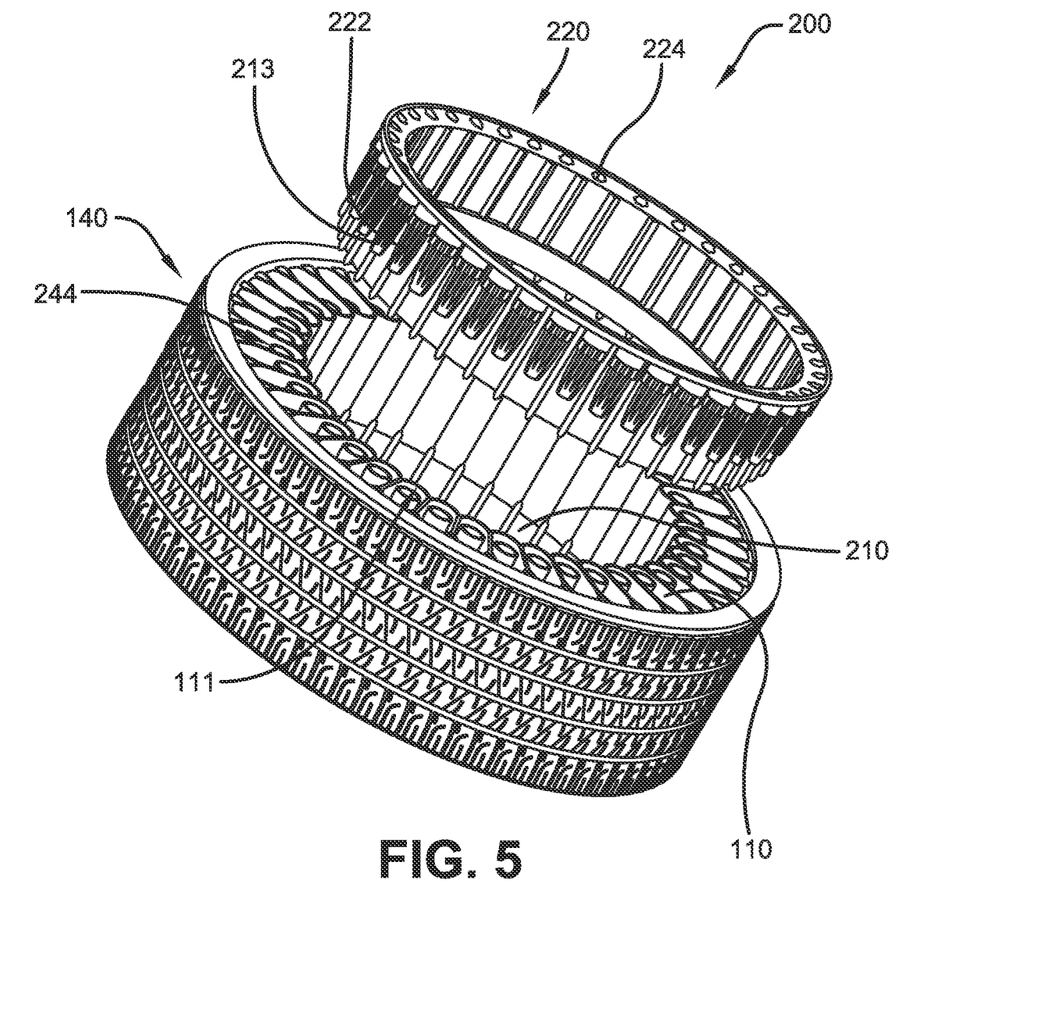
FIG. 5 is a still another schematic perspective view of the assembled wheel/tire assembly of FIG. 4 and an example third part of the wheel assembly of FIG. 4.
Figure 6:
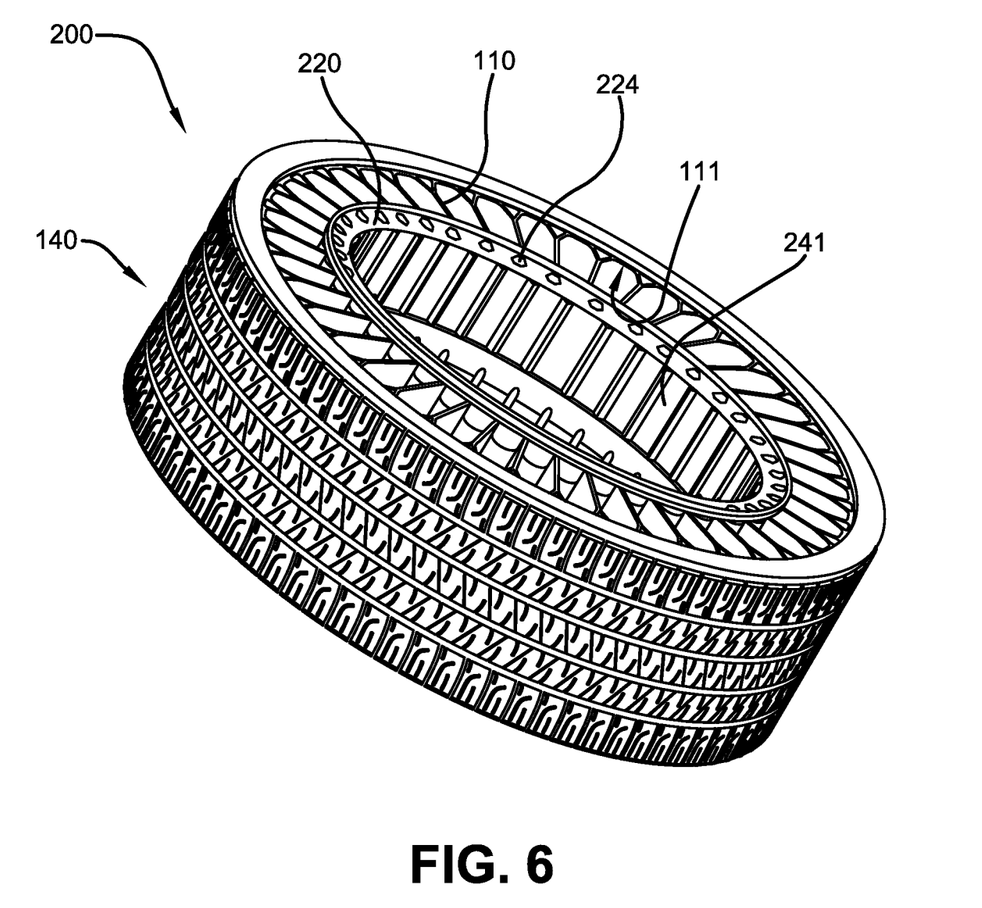
FIG. 6 is yet another schematic perspective view of the assembled first, second, and third parts, as well as the example tire, of the wheel/tire assembly of FIG. 5.
Figure 7:
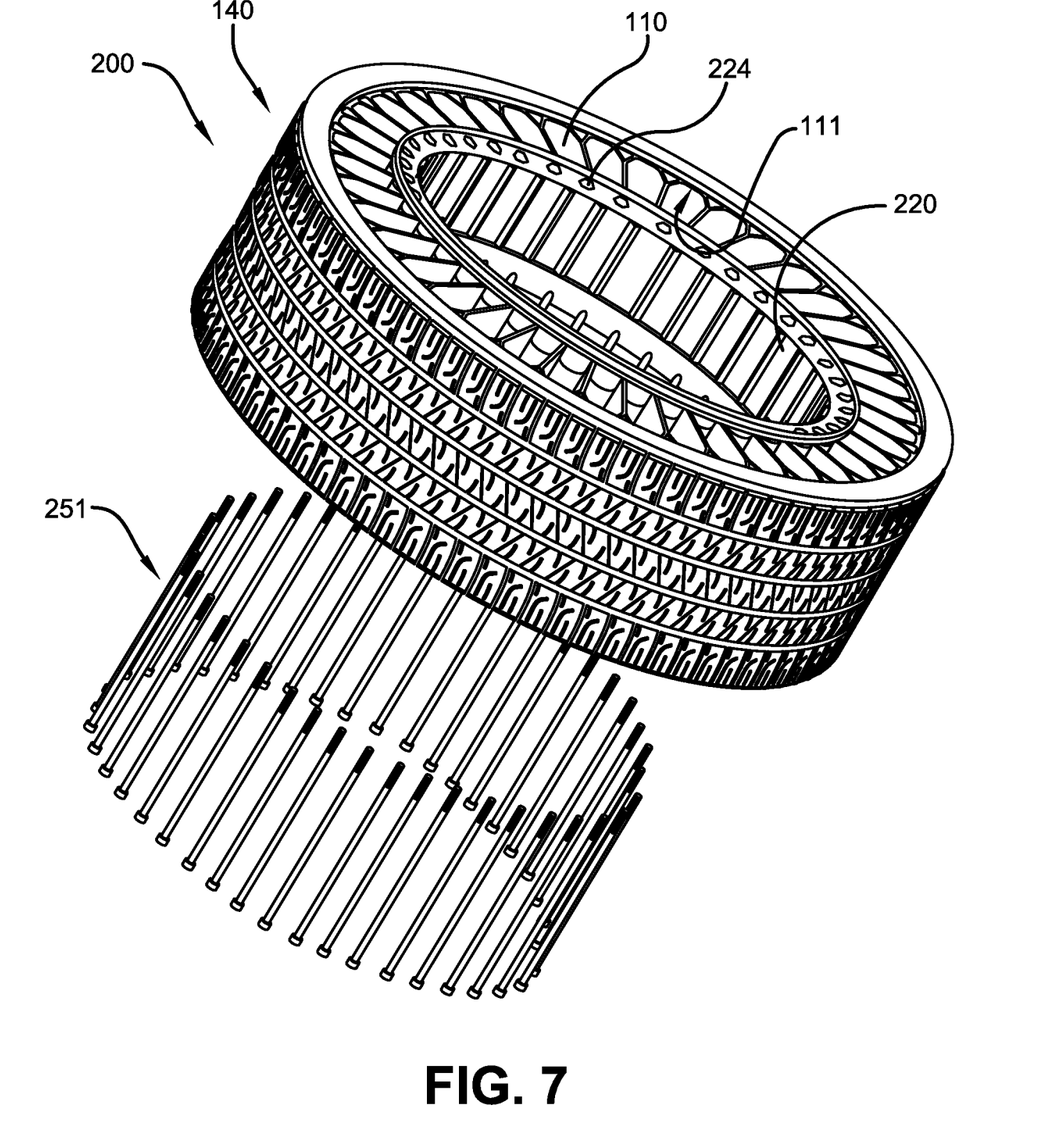
FIG. 7 is still another schematic perspective view of the wheel/tire assembly of FIG. 6 and an example fourth part of the wheel/tire assembly of FIG. 6.
Figure 8:
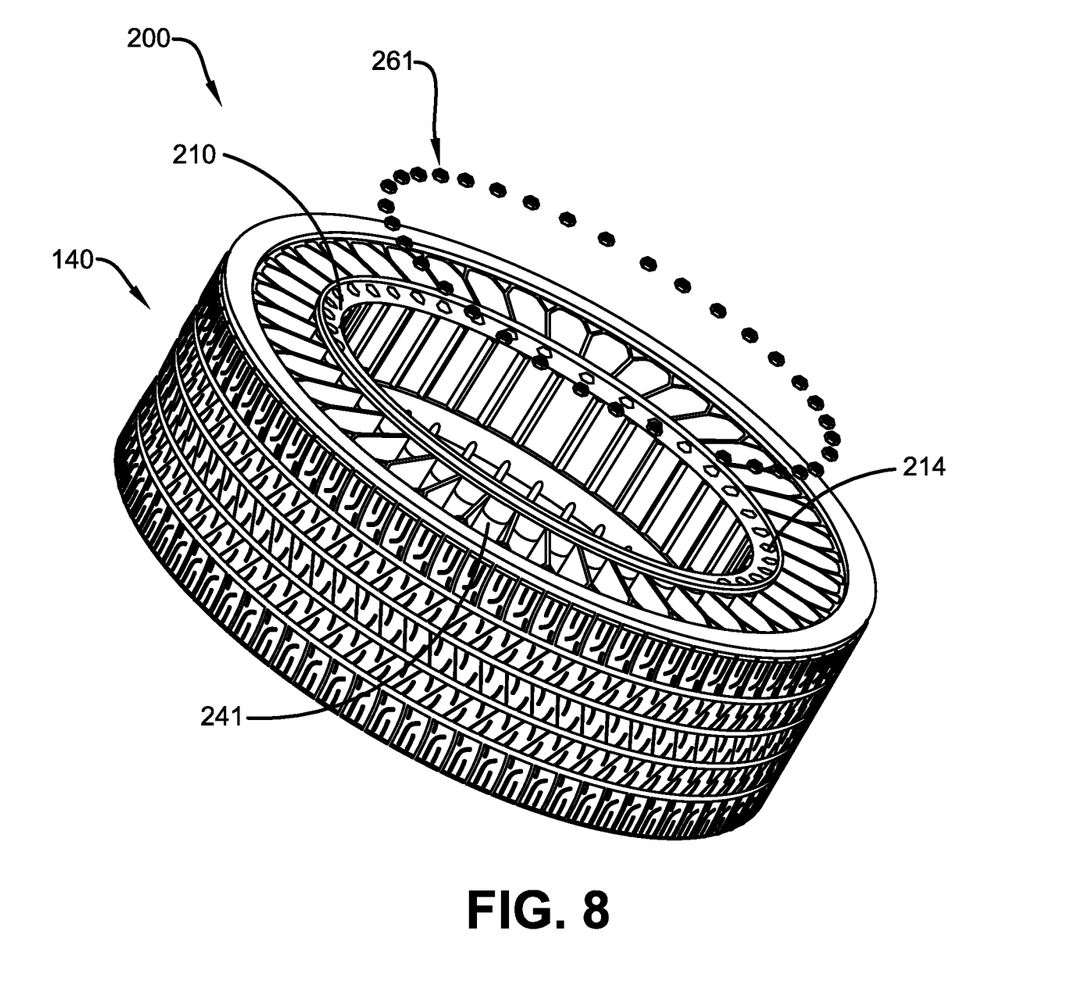
FIG. 8 is yet another schematic perspective view of the wheel/tire assembly of FIG. 7 and an example fifth part of the wheel/tire assembly of FIG. 7.
Figure 9:
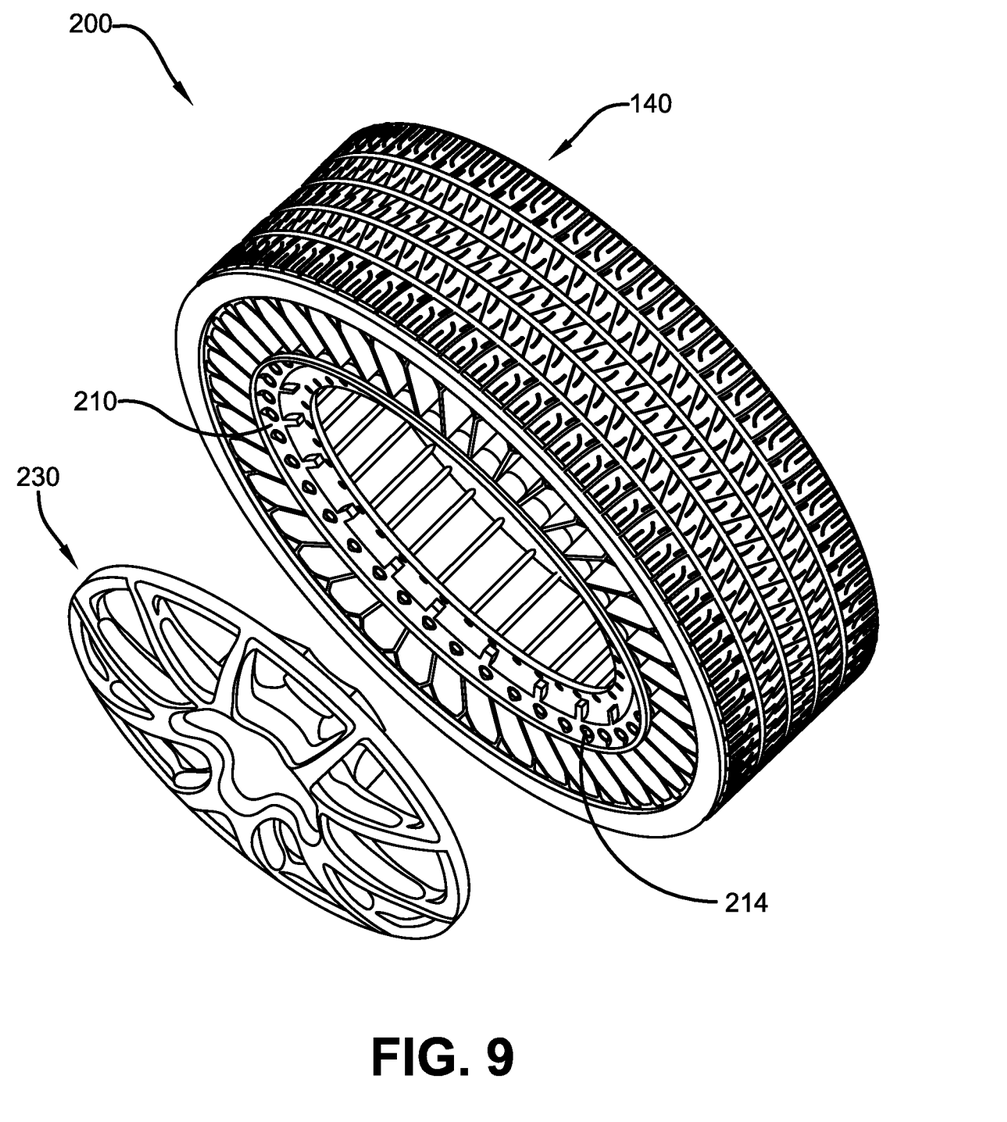
FIG. 9 is still another schematic perspective view of the wheel/tire assembly of FIG. 8 and an example sixth part of the wheel/tire assembly of FIG. 8.
Figure 10:
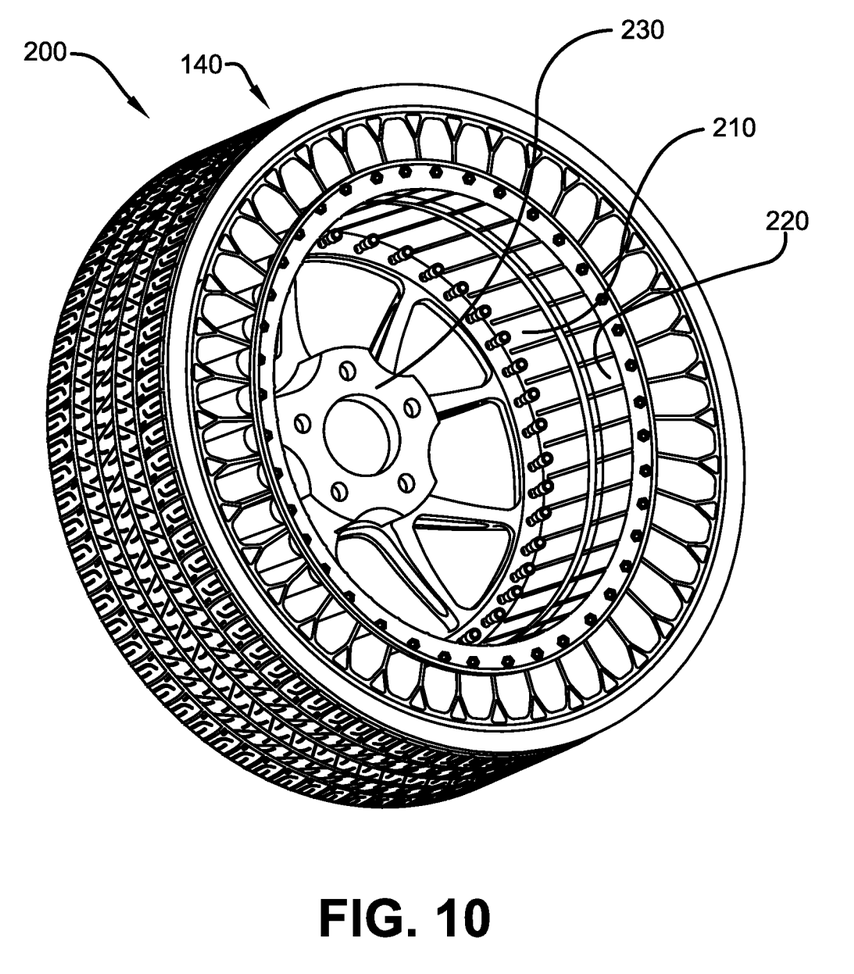
FIG. 10 is yet another schematic perspective view of the assembled wheel/tire assembly of FIG. 9.
Figure 11:
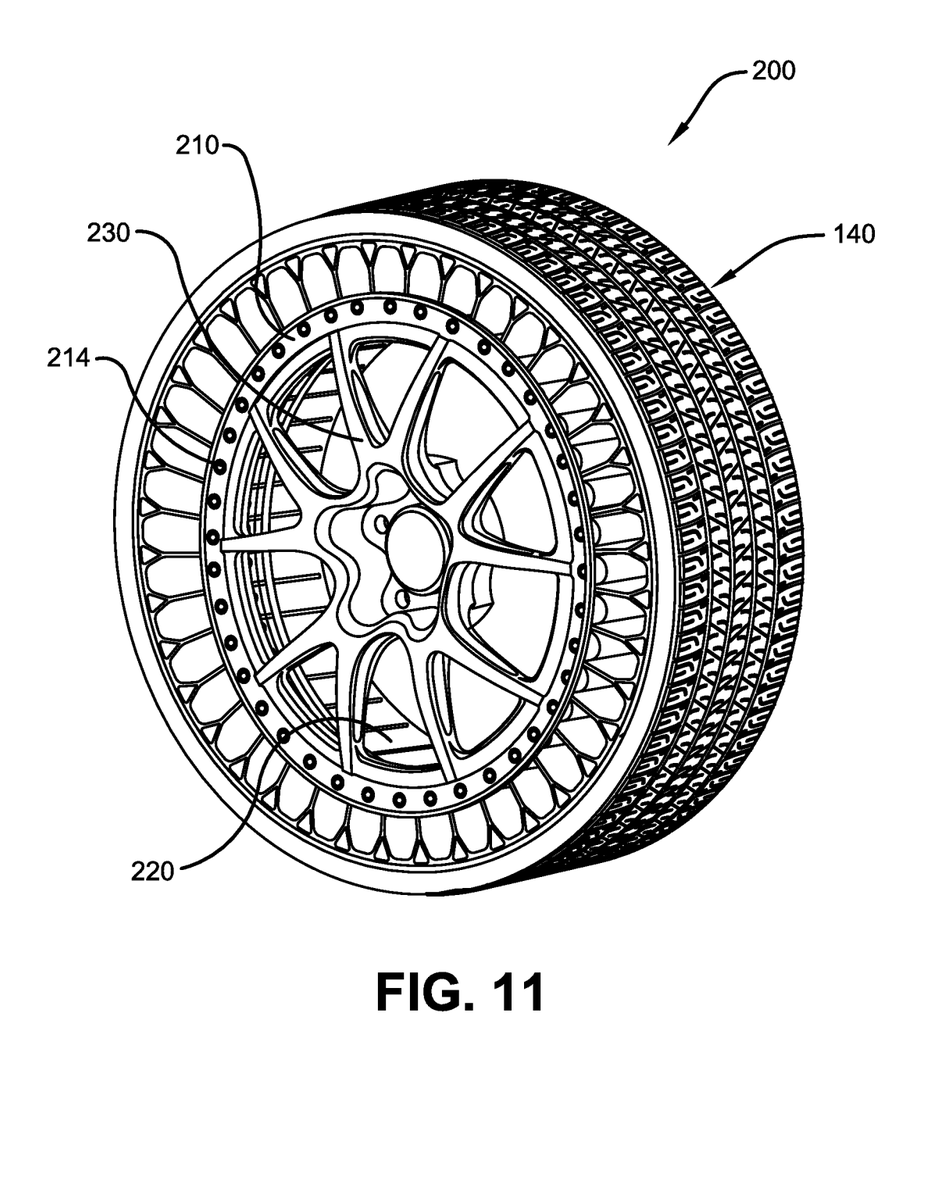
FIG. 11 is still another schematic perspective view of the wheel/tire assembly of FIG. 10.
Figure 12:
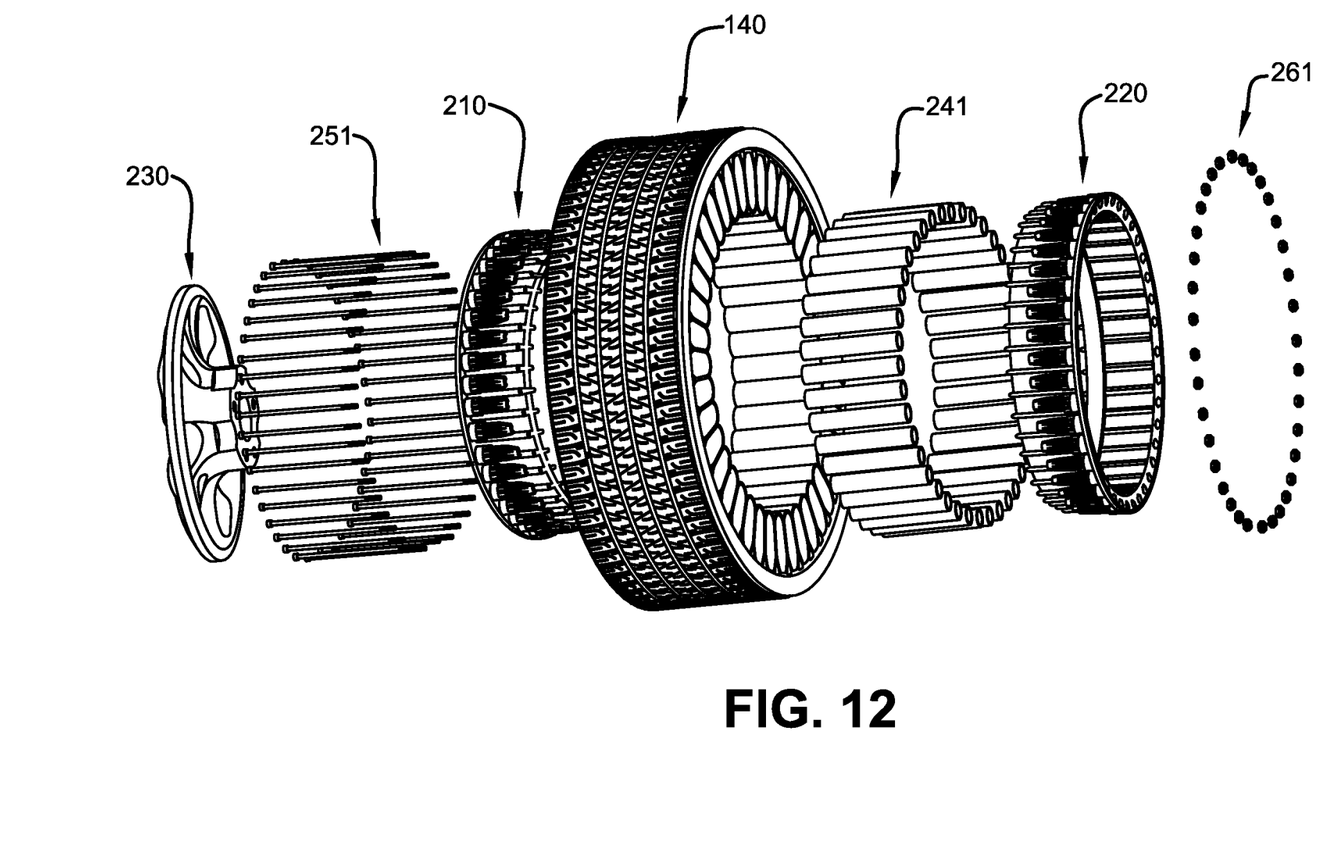
FIG. 12 is a schematic exploded perspective view of the wheel/tire assembly of FIGS. 10-11.

Once these elements 140, 210, 220, 230 have been assembled, each first bore hole 214 of the first rim piece 210 may align axially with a corresponding second bore hole 224 of the second rim piece 220 (FIG. 12). Each corresponding pair of bore holes 214, 224 of each rim piece 210, 220 may be radially and circumferentially secured and fixed in these aligned relative positions by a corresponding bolt member of a plurality of bolt members 251 and a corresponding fastener member of a plurality of fastener members, or nut members 261.

Figure 13:
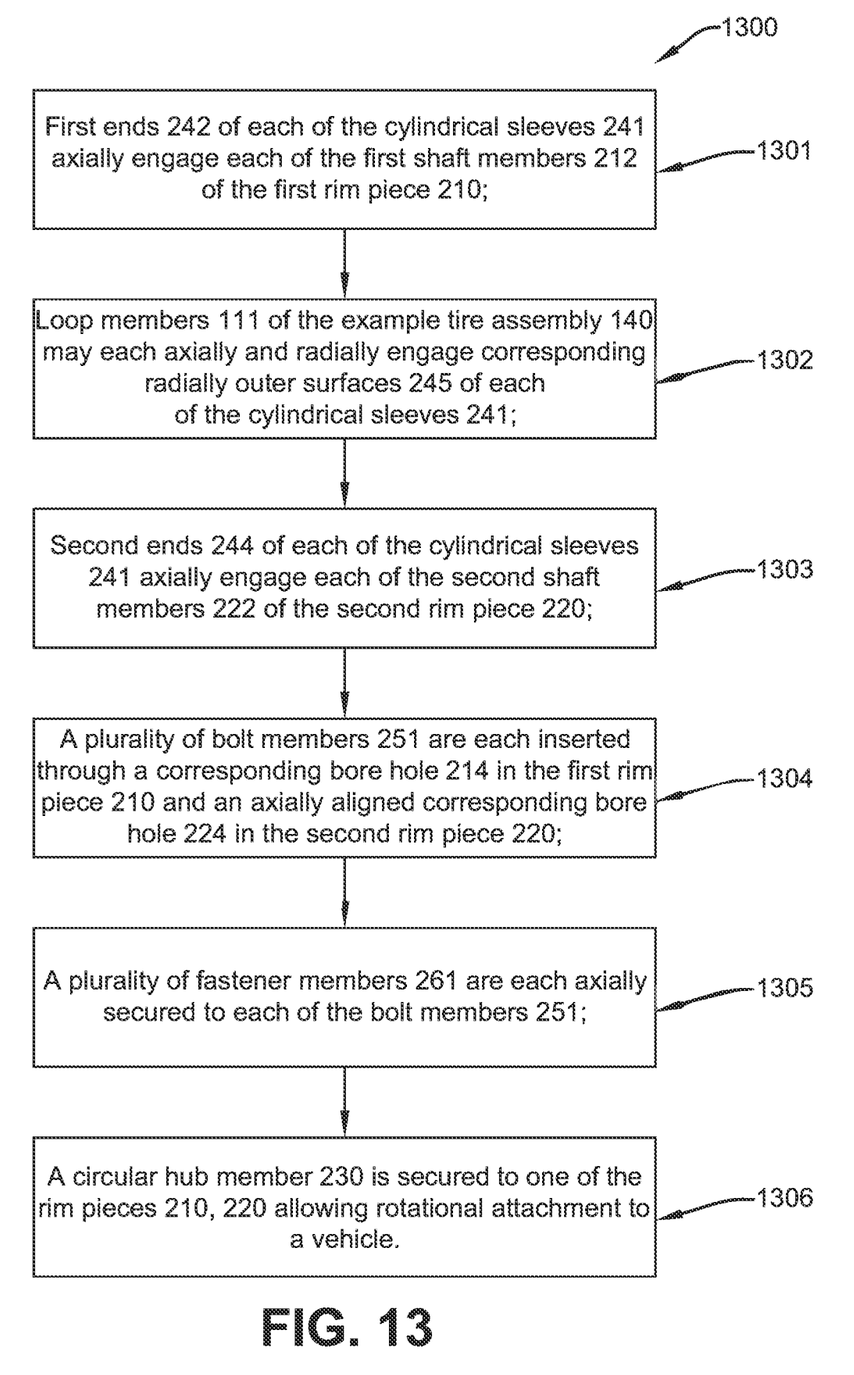
FIG. 13 is a schematic flow diagram of an example method in accordance with the present invention.

As shown in the FIG. 13, a method 1300 for non-pneumatically supporting a vehicle load, in accordance with the present invention, may include: a first step 1301 such that first ends 242 of each of the cylindrical sleeves 241 axially engage each of the first shaft members 212 of the first rim piece 210; a second step 1302 such that loop members 111 of the example tire assembly 140 may each axially and radially engage corresponding radially outer surfaces 245 of each of the cylindrical sleeves 241; a third step 1303 such that second ends 244 of each of the cylindrical sleeves 241 axially engage each of the second shaft members 222 of the second rim piece 220; a fourth step 1304 such that a plurality of bolt members 251 are each inserted through a corresponding first bore hole 214 in the first rim piece 210 and an axially aligned corresponding second bore hole 224 in the second rim piece 220; a fifth step 1305 such that a plurality of fastener members 261 are each axially secured to each of the bolt members 251; and a sixth step 1306 such that a circular hub member 230 is secured (e.g., welded, bolted, interference fit, etc.) to one of the rim pieces 210, 220 allowing rotational attachment to a vehicle.

Variations in the present invention are possible in light of the description of it provided herein. While certain representative examples and details have been shown for the purpose of illustrating the present invention, it will be apparent to those skilled in this art that various changes and/or modifications may be made therein without departing from the scope of the present invention. It is, therefore, to be understood that changes may be made in the particular examples described herein, which will be within the full scope of the present invention as defined by the following appended claims. Further, the present invention is not limited to the examples hereinbefore described, which may be varied in construction and/or detail within the full scope of the appended claims.

What is claimed:

1. A wheel assembly for a tire comprising:
a circular hub member for securing to a rotatable axle of a vehicle;
a first rim piece for engaging the hub member;
a second rim piece for engaging the first rim piece; and
a plurality of cylindrical sleeves for engaging both the first rim piece and the second rim piece, the first rim piece having cylindrical first shafts each engaging a first end of one of the sleeves, the second rim piece having cylindrical second shafts each engaging a second opposite end of one of the sleeves, an outer cylindrical surface of each sleeve engaging a separate and distinct part of the tire.

2. The wheel assembly as set forth in claim 1 wherein the first rim piece has first securement openings arrayed circumferentially about the first rim piece.

3. The wheel assembly as set forth in claim 2 wherein the second rim piece has second securement openings arrayed circumferentially about the second rim piece.

4. The wheel assembly as set forth in claim 3 wherein each of the first securement openings of the first rim piece is axially aligned with a corresponding second securement opening of the second rim piece.

5. The wheel assembly as set forth in claim 4 wherein each corresponding pair of first and second securement openings are radially and circumferentially secured and fixed in axially aligned relative positions by a bolt member of a plurality of bolt members and a corresponding fastener member of a plurality of fastener members.

6. The wheel assembly as set forth in claim 1 wherein the outer cylindrical surface of each sleeve engages corresponding loops of the tire.

7. The wheel assembly as set forth in claim 1 wherein each first and second shaft engages a cylindrical inner surface of one of the sleeves.

8. The wheel assembly as set forth in claim 1 wherein the first and second rim pieces are constructed of a metal.

9. The wheel assembly as set forth in claim 1 wherein the first and second rim pieces are constructed of a polymer.

10. A non-pneumatic tire and wheel assembly comprising:
a tire having an outer tread band and a plurality of loops extending radially inward, a circular hub member for securing to a rotatable axle of a vehicle;
a first rim piece for engaging the hub member;
a second rim piece for engaging the first rim piece; and
a plurality of cylindrical sleeves for engaging both the first rim piece and the second rim piece, the first rim piece having cylindrical first shafts each engaging a first end of one of the sleeves, the second rim piece having cylindrical second shafts each engaging a second opposite end of one of the sleeves, an outer cylindrical surface of each sleeve engaging a respective spoke loop of the tire, wherein the first shafts and the second shafts have serrated cylindrical surfaces for securely fixing the sleeves to the first shafts and second shafts,
wherein the first shafts and the second shafts have serrated cylindrical surfaces for securely fixing the sleeves to the first shafts and second shafts.

11. A method for supporting a vehicle load, the method comprising the steps of:
axially engaging first ends of cylindrical sleeves by serrated first shaft members of a first rim piece;
axially engaging second ends of the cylindrical sleeves by serrated second shaft members of a second rim piece;
axially and radially engaging loop members of a tire assembly by outer cylindrical surfaces of the cylindrical sleeves; and
inserting each of a plurality of bolt members through one first bore hole in the first rim piece and one axially aligned corresponding second bore hole in the second rim piece.

12. The method as set forth in claim 11 further including a step of axially securing a plurality of fastener members to each of a plurality of bolt members.

13. The method as set forth in claim 11 further including a step of securing a circular hub member to the first rim piece thereby allowing rotational attachment to a vehicle.

14. The method as set forth in claim 11 further including a step of arraying the first bore holes circumferentially about the first rim piece.

15. The method as set forth in claim 14 further including a step of arraying the second bore holes circumferentially about the second rim piece.

16. The method as set forth in claim 11 further including a step of arraying the first bore holes circumferentially about the first rim piece.

17. The method as set forth in claim 11 further including a step of radially and circumferentially fixing the first rim piece to the second rim piece in axially aligned relative positions by the bolt members and a corresponding fastener member.

18. The method as set forth in claim 11 further including a step of engaging a cylindrical inner surface of each of the sleeves by one of the first shaft members.

19. The method as set forth in claim 18 further including a step of engaging the cylindrical inner surface of each of the sleeves by one of the second shaft members.

20. The method as set forth in claim 11 further including a step of engaging a cylindrical inner surface of each of the sleeves by one of the first shaft members and a corresponding one of the second shaft members.

21. A non-pneumatic tire and wheel assembly comprising:
a tire having an outer tread band and a plurality of loops extending radially inward, a circular hub member for securing to a rotatable axle of a vehicle;
a first rim piece for engaging the hub member;
a second rim piece for engaging the first rim piece; and
a plurality of cylindrical sleeves for engaging both the first rim piece and the second rim piece, the first rim piece having cylindrical first shafts each engaging a first end of one of the sleeves, the second rim piece having cylindrical second shafts each engaging a second opposite end of one of the sleeves, an outer cylindrical surface of each sleeve engaging a respective spoke loop of the tire, wherein the first shafts and the second shafts have serrated cylindrical surfaces for securely fixing the sleeves to the first shafts and second shafts.

* * * * *